NEGATIVE RESISTANCE MEMORY MATRIX

Filed July 5, 1962

INVENTORS
JAN A. NARUD
PAUL E. STUCKERT

BY S. P. Tedesco

ATTORNEY 3,271,746
Patented Sept. 6, 1966

3,271,746

NEGATIVE RESISTANCE MEMORY MATRIX

Jan A. Narud, Scottsdale, Ariz., and Paul E. Stuckert, Katonah, N.Y., assignors to International Business Machines Corporation, New York, N.Y., a corporation of New York Filed July 5, 1962, Ser. No. 207,647
14 Claims. (Cl. 340—173)

This invention relates to memory matrices and, more particularly, to memory matrices employing negative resistance devices.

Some of the requirements of present day, high-speed computer systems are best satisfied by random access memories of the nondestructive readout type. A nondestructive readout, random-access memory is defined as one wherein the word locations can be selectively read without desttruction of the stored information. Such memories inherently exhibit shorter cycle times than do memories of the destructive readout type as interrogation of the latter necessarily includes a regenerate operation. Since the cycle time, i.e. that necessary time interval between subsequent read or write operations, of a memory is a limit on the operational speed of a computer system, memories of shorter cycle time must be developed as operational speed requirements of computer systems are increased.

Recent advances in technology have introduced new bistable memory devices compatible with these increased operational speeds. The tunnel diode, for example, has received widespread acceptance because of several important characteristics, notable among which are: adaptability to bistable operation due to an inherent negative resistance characteristic; switching speeds in the order of 1 nsec. (1 nsec.=1 nanosecond=$10^{-9}$ secs.); low power consumption; low sensitivity to adverse environmental conditions, i.e. temperature variations, radiation, etc. The fast switching speed of tunnel diodes is primarily due to a "quantum-mechanical tunneling" of majority carriers across a very thin junction which, theoretically, occurs at the speed of light but is practically limited by junction capacitance and external circuit parameters.

When memory cells comprising devices exhibiting negative resistance characteristics are arranged in a memory matrix, proper coupling of energy to and from selected cells in the array to perform the necessary write and read operations is very important. For example, with improper coupling, signal energy indicative of binary information from an interrogated memory cell to a sensing device during the interrogation cycles can be attenuated so as to render said signals hardly discernible. A fundamental problem in the design of memory arrays, therefore, has been to improve coupling methods so as to maximize the "1" to "0" signal ratio and the absolute magnitude of the "1" signal; accordingly, the necessity of employing sophisticated driving and readout circuits which objectionably increase the complexity and also the cost of the memory matrix is avoided. Also, improper coupling methods can unnecessarily limit the capacity of the memory matrix.

This invention, therefore, is particularly directed to new and novel coupling methods for obviating certain disadvantages of prior art memory matrices.

Another object of this invention is to provide an improved memory matrix employing tunnel diodes as basic memory elements.

Another object of this invention is to provide an improved memory matrix employing negative resistance devices as basic memory elements and which is adapted for nondestructive readout, has a very fast access time, and provides maximum discrimination between signals indicative of stored binary information when interrogated.

Another object of this invention is to provide a more efficient coupling method for memory matrices employing negative resistance devices as basic memory elements.

Prior art coupling arrangements have generally employed semiconductor diodes in typical "OR"—gate arrangement, for example, as shown in Patent 3,107,345, which issued on October 15, 1963, in the name of A. J. Gruodis, and assigned to the same assignee as this application. In such arrangements, each coupling diode is normally biased so as to be substantially nonconducting during quiescent conditions regardless of the state of the memory cell, i.e. binary "1" or binary "0"; during interrogation, only diodes coupling interrogated memory cells in a designated binary state, e.g. binary "1," are forward biased sufficiently to deliver detectable signal energy to a sensing device.

In accordance with this invention, however, many limitations imposed by prior art coupling arrangements are overcome by determining quiescent conditions within the memory matrix to normally forward bias coupling diodes associated with memory cells in a binary "1" state. Negative resistance devices employed as memory elements develop distinct voltages thereacross peculiar to each memory state. Accordingly, quiescent voltages are selected to bias each diode coupling a memory cell in a binary "1" state to a sensing device slightly beyond the knee of its current-voltage characteristic. During interrogation, therefore, diodes coupling interrogated memory cells in a binary "1" state are immediately driven further into the conduction region. On the other hand, diodes coupling memory cells in a binary "0" state are biased below the knee of its current-voltage characteristic so as to be driven along only the high resistance portion of the characteristic and not into conduction during interrogation.

It is evident that any number of coupling diodes multiplied to a same sensing device can be forward biased concurrently; such condition, however, does not have a detrimental effect on the operation of a memory matrix in accordance with the principles of this invention. As the coupling diode is normally forward biased, an interrogated memory cell in a binary "1" state is a low impedance source in series arrangement with all other memory cells paralleled along a common line to a sensing device. The input impedance of each paralleled-uninterrogated memory cell in a binary "1" state, on the other hand, is high since the forward biased coupling diode provides a nonlinear load line for the associated memory element defining the high-voltage stable operating point along the high-resistance valley portion of the current-voltage characteristic curve. During interrogation, therefore, each of the paralleled-uninterrogated memory cells in a binary "1" state exhibits a high input impedance as current change through the associated coupling diode only shuttles this operating point along the very high-resistance valley portion of the current-voltage characteristic curve; diodes coupling paralleled-uninterrogated memory cells in a binary "0" state normally present a high input impedance. Accordingly, the signal energy delivered to the common sense line by an interrogated memory cell in the "1" state is essentially unattenuated. Moreover, as the input impedance of each paralleled-uninterrogated memory cell is high and the interrogated memory cell is a low impedance source, the word capacity of the memory matrix may be increased over that permissable when prior art coupling methods are employed.

The foregoing and other objects, features, and advantages of the invention will be apparent from the following more particular description of preferred embodiments of the invention, as illustrated in the accompanying drawings.

Figure 2:
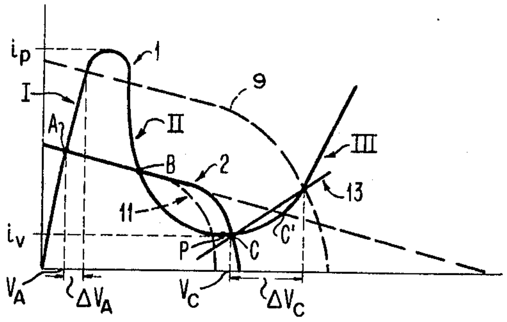
FIG. 2 illustrates the current-voltage characteristic curve of a tunnel diode, slightly idealized.

The current-voltage characteristic curve of a tunnel diode is illustrated by curve 1 in FIG. 2. When biased in a forward direction, the current through a tunnel diode exhibits a rise to a maximum peak current $i_p$ along a "low voltage" portion I, a drop along a negative resistance portion II to a minimum valley current $i_v$, and a subsequent rise along a "high voltage" portion III of the curve. The tunnel diode is adapted for bistable operation when a static load line 2 intersects curve 1 of FIG. 2 at three points, the intermediate point necessarily being along portion II of the characteristic curve and defining an unstable operating point. The static load line 2, a portion of which is shown dashed, resulting from linear resistive loading normally intersects portions I and III at stable operating points A and C′, respectively. In the embodiment hereinafter described, the tunnel diode has a nonlinear, shunt, resistive load in the form of a semiconductor coupling diode having current-voltage characteristics as illustrated by curve 6 in FIG. 3 and adapted to be biased beyond the knee 3 (threshold voltage $V_D$) when the tunnel diode is in a high voltage state. The static load line 2, therefore, is modified and intersects the tunnel diode characteristics at operating point C along the high-resistance valley portion of curve 1 of FIG. 2. Alternatively, a back diode can be similarly employed. Operation of the tunnel diode at stable operating points A or C, therefore, is indicative of the storage of the binary quantities "0" and "1," respectively. It is evident that static load line 2 can be modified to intersect portion III or doubly intersect portion II of curve 1 whereby operating point C is defined either to the right or left of the valley point P; in the latter event, points B and C should be adequately separated to prevent false switching of the tunnel diode by spurious signals, e.g. noise, etc.

The tunnel diode is switched between stable operating points A and C by displacing the static load line 2 downwardly or upwardly, respectively, with respect to curve 1 of FIG. 2 so as to define a single operating point along either portions I or III, respectively. For example, momentarily increasing current through the tunnel diod in excess of the peak current $i_p$ elevates static load line 2 so as to define a single operating point along portion III of curve 1; conversely, momentarily decreasing current through the tunnel diode below the valley current $i_v$ lowers static load line 2 so as not to intersect portion II of curve 1 and defines a single operating point along portion I. When returned to a quiescent state, the operation of the tunnel diode moves along portions III and I of the curve of FIG. 2 to stable operating points C and A, respectively.

Figure 1:
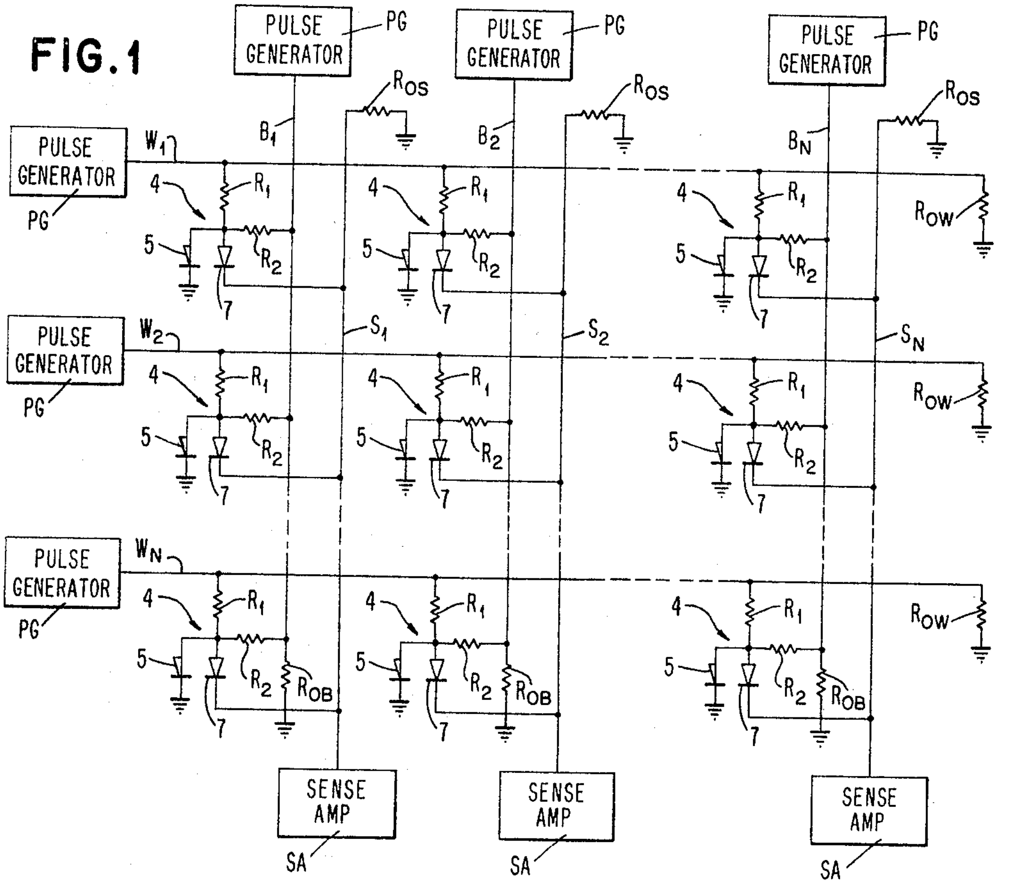
FIG. 1 illustrates a memory matrix in accordance with this invention wherein tunnel diodes are employed as basic memory elements.

An illustrative embodiment of a memory matrix in accordance with this invention and utilizing tunnel diodes as memory elements is shown in FIG. 1. The memory matrix comprises a number of parallelly-arranged word drive lines $W_1, W_2 \ldots W_N$ in transverse arrangement with a number of parallelly-arranged bit drive lines $B_1, B_2 \ldots B_N$. Each of the word drive lines W and bit drive lines B are preferably transmission lines properly terminated in characteristic impedances $R_{OW}$ and $R_{OB}$, respectively, and connected at the other end to a drive pulse generator PG. Each pulse generator PG may be of a conventional type and directs properly timed pulses of proper polarity and amplitude to effect the clearing, writing, and interrogating operations hereinafter described.

A memory cell 4 is connected at each crossover point between a word drive lines W and a bit drive line B. Each memory cell 4 comprises a pair of tandemly-arranged resistors R1 and R2 connected to word drive line W and bit drive line B, respectively, and a tunnel diode 5 connected to the junction of the resistors and returned to ground. Operational currents are supplied to each of memory cells 4, for example, by voltage sources included in pulse generators PG and supplied along the corresponding word and bit drive lines W and B. To prevent the parallel additions of resistors R1 and R2 from loading word drive line W and bit drive line B, resistors R1 and R2 when divided by the number of memory cells M and N, respectively, multipled thereto should have a greater ohmic value than terminating resistors $R_{OW}$ and $R_{OB}$, respectively, i.e.

$$R_{OW} < R1/M \text{ and } R_{OB} < R2/N$$

The junctions of resistors R1 and R2 with the anodes of tunnel diodes 5 in memory cells 4 at corresponding bit slots in word addresses defined by drive lines W, respectively, are coupled through semiconductor diodes 7 and along a common sense line S to a sense amplifier SA. Sense lines S are preferably transmission lines properly terminated at one end in characteristic impedance $R_{OS}$ and connected at the other end to a sense amplifier SA.

Storage of information at a particular word address is effected by coincident-bit or half-selection techniques. The word address is initially cleared to the "0" state by a negative pulse directed along the corresponding word drive line W by pulse generator PG. This negative pulse applied through resistors R1 is effective to depress the current, i.e. the static load line 2, below the valley current $i_v$ whereby each tunnel diode 5 switches to the low voltage operating state. Information is then written in the word location by positive pulses directed by pulse generators PG concurrently along appropriate word drive line W and those bit drive lines B connected to memory cells 4 wherein a binary "1" is to be stored. The positive pulses applied along selected word and bit drive lines W and B and through resistors R1 and R2, respectively, bias tunnel diode 5 in excess of its peak current $i_p$. A positive pulse singularly applied along either a word drive line W or a bit drive line B, however, is ineffective to switch the tunnel diodes in any of the memory cells 4; such pulses only momentarily shuttle the operation of the tunnel diode 5 upwardly along portions I or III of curve 1 of FIG. 2 as indicated by the dashed curve 9 of FIG. 2; however, upon cessation of the write-in pulse, tunnel diode 5 returns to quiescent operating points defined by static load line 2.

If static load line 2 resulted from a linear resistance load, the quiescent operating points of tunnel diode 5 would be defined at points A and C′ of curve 1. Each sense line S, however, is biased by a source, for example, included in the connected sense amplifier SA such that the intersection C corresponds to point 1 of curve 6 of FIG. 3. More particularly, the algebraic sum of the bias voltage along each sense lead S and the voltage $V_C$ developed across tunnel diode 5 operating at point C should be equal to or greater than threshold voltage $V_D$ corresponding to knee 3 of the current-voltage characteristic curve 6 of coupling diode 7. Therefore, when tunnel diode 5 is operating in a low voltage state at point A, i.e. binary "0," the associated coupling diode 7 is biased at point 0 of curve 6 and exhibits a high impedance. The linear portion of static load line 2, therefore, is essentially determined by the parallel arrangement of resistors R1 and R2. Conversely, when the tunnel diode is in a high voltage state, i.e. binary "1," the associated coupling diode is forward biased at point 1 of curve 6. As coupling diode 7 and resistors R1 and R2 are arranged in parallel with respect to tunnel diode 5 in each memory cell 4, the static load line 2 is modified so as to define the high voltage stable operating point C along the high-resistance valley portion of curve 1.

Interrogation of a word location is effected by a positive pulse directed by pulse generator PG along the corresponding word drive line W. The interrogation pulse displaces the static load line 1 upwardly as indicated by dashed curve 9 of FIG. 2 and shuttles the operating points of the tunnel diode 5 upwardly along either portion I or portion III of the curve 1 but is insufficient to switch the tunnel diode. When interrogated in a high voltage state, the resultant voltage change $\Delta V_C$ across the tunnel diode 5 drives coupling diode 7 further into conduction to point 1' of curve 6 so as to direct detectable signal energy along connected sense line S. A preferred method of operation is to provide that tunnel diode 5 and also that coupling diode 7 exhibit a same dynamic impedance during the interrogation cycle. Wen interrogated in a low voltage state, the resultant voltage change $\Delta V_A$ across tunnel diode 5 shuttes coupling diode 7 along the very high resistance portion of the curve to point 0' of curve 6 whereby essentially no signal energy is directed along connected sense line S.

To more fully appreciate this invention, reference is again made to FIGS. 2 and 3 wherein biasing conditions of coupling diode 7 for each memory state of the associated memory cell under quiescent operating conditions and also during the interrogation cycle are depicted. While tunnel diode 5 is in a low voltage state, coupling diode 7 is biased at point 0 of curve 6 and conduction therethrough is insignificant; however, while the tunnel diode 5 is in a high voltage state, coupling diode 7 is slightly forward biased at the knee 3 of its characteristic curve and, therefore, there is a finite conduction therethrough. A current path can be traced along the connected word and bit drive line W and B, through the resistors R1 and R2, respectively, and through coupling diode 7 in parallel with tunnel diode 5 in a high voltage state to a sense line S.

An interrogated memory cell 4 in a binary "1" state, i.e. the high voltage state, must drive as a load the parallel combination of memory cells 4 multipled to a same sense line S. Since the coupling diode 7 is forward biased, the source impedance of memory cells 4 during the interrogation cycle is essentially determined by the parallel arrangement of resistors R1 and R2 and the equivalent dynamic impedance of tunnel diode 5 as indicated by line 13 of FIG. 2 in series with the dynamic impedance of the coupling diode. Therefore, as resistors R1 and R2 are very much larger than the equivalent impedance of tunnel diode 5 when operating at point C, i.e. in a high voltage state, each memory cell 4 is, in effect, a low impedance source. Also, it is evident that more than one or even all of the memory cells 4 multipled to a same sense line S can be in a binary "1" state whereby the associated coupling diodes 7 are forward biased concurrently. Rather than producing a loading effect, the effective equivalent impedance of each memory cell 4 is sufficiently high whereby signal energy directed along the sense lead S during the interrogation cycle is essentially unattenuated. For example, when tunnel diode 5 is operating along the substantially flat valley portion at point C of curve 1 and coupling diode 7 is forward biased, the input impedance of each uninterrogated memory cell 4 in a binary "1" state is determined by the parallel arrangement of resistors R1 and R2 and the equivalent impedance of tunnel diode 5. As the slope of the characteristic curve of the tunnel diode along the valley portion is substantially equal to zero, the equivalent impedance of the tunnel diode is essentially infinite whereby the input impedance of each uninterrogated memory cell 4 in a binary "1" state is high, being essentially equal to the parallel arrangement of resistors R1 and R2 in tandem with the word and bit drive lines W and B, respectively.

Figure 3:
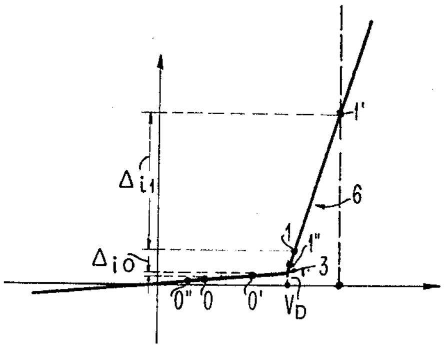
FIG. 3 illustrates an idealized current-voltage characteristic curve of a semiconductor diode device employed as a coupling element in the memory matrix of FIG. 1.

Depending on the state of the memory cell 4, the resultant voltages $\Delta V_A$ and $\Delta V_C$ developed across tunnel diode 5 during the interrogation cycle shuttle coupling diode 7 along curve 6 of FIG. 3 from point 0 and along the high resistance portion of the curve to point 0' or from point 1 to point 1', respectively. The resultant increase in current flow $\Delta i_O$ through the coupling diode 7 when shuttled from point 0 to point 0' and along sense lead S is small. When memory cell 4 is interrogated in a binary "1" state, however, coupling diode 7 is shuttled from point 1 to point 1' and significantly greater current $\Delta i_1$ flows along the sense line S to sense amplifier SA. Current $\Delta i_1$ along sense lead S causes uninterrogated coupling diodes 7 to shuttle along curve 6 from the point 1 to the point 1'' or along the high resistance portion from point 0 to point 0'' depending on the memory state of the memory cells 4. Backward current through coupling diodes 7 connected to uninterrogated memory cells 4 in a binary "0" state is insignificant; backward current through coupling diodes 7 connected to uninterrogated memory cells 4 in a binary "1" state, however, shifts high voltage portion of the static load line 1 of such cells downwardly as indicated by the dashed curve 11. Accordingly, the operating point C of memory cells 4 is momentarily shifted toward the left and along the negative resistance portion II of curve 1. Any loading effect of uninterrogated memory cells 4 in a binary "1" state on sense line S can be modified by altering the position of quiescent operating point C. The loading effect of uninterrogated memory cells in a binary "1" state, therefore, is given by the parallel combination of the resistors R1 and R2, designated $R_P$, in parallel with the equivalent dynamic impedance $R_D$ of the tunnel diode, i.e.

$$R_P(\pm R_D)/R_P+(\pm R_D)$$

The equivalent impedance of an uninterrogated memory cell 4 to current through coupling diode 7 is very high and can be negative when operating point C of tunnel diode 5 is shuttled along portion II of curve 1. Theoretically, when the equivalent impedance exhibited by the tunnel diode 5 is negative and equal to the parallel sums of the resistances $R1+R2$, the impedance presented by the memory cells 4 approaches infinity. Therefore, signal indication $\Delta i_1$ directed along sense line S during the interrogation cycle is not attenuated when coupling diodes 7 multipled thereto are in a forward biased state.

Prior art techniques wherein coupling diodes are substantially reversed biased regardless of the memory state of the associated memory cells 4 increase the access time of a memory matrix. Coupling techniques as hereinabove described, however, allow maximum word capacity and also reduce the access time of the memory matrix. Establishing conditions within the memory matrix such as to forward bias each coupling diode beyond knee 3 of curve 6 of FIG. 3 while its associated memory cell 4 is in a binary "1" state provides that each coupling diode is more rapidly driven into proportionately greater conduction than by these prior art arrangements. Moreover, albeit the coupling diodes are in a slightly forward biased state, there is virtually no loading on sense line S so as to improve the absolute magnitude of the "1" signal and, therefore, the "1" to "0" signal ratio.

While the invention has been particularly shown and described with reference to preferred embodiments thereof, it will be understood by those skilled in the art that various changes in form and details may be made therein without departing from the spirit and scope of the invention.

What is claimed is:

1. In a memory array comprising a plurality of bistable memory elements arranged in a coordinate array, each of said memory elements having a current-voltage characteristic having a negative resistance region between a first and a second positive resistance region, said negative resistance region being continuous with said second positive resistance region along a high-resistance valley region, means for selectively switching each of said memory elements between bistable states defined along said characteristic and indicative of binary information, one of said bistable states being defined along that positive resistance region discontinuous with said valley region, sensing means connected along asymmetrical diode devices to predetermined groups of said memory elements, and means including said sensing means for ascertaining the memory state of selected elements in each of said groups, the improvement comprising means for biasing each of said diode devices connected to memory elements operating in the other of said bistable states beyond the knee of its current-voltage characteristic to define said other binary state in said valley region of said characteristic.

2. In a circuit arrangement, a plurality of elements having a first and a second stable state of operation and each exhibiting a current-voltage characteristic having a negative resistance region intermediate a first and a second positive resistance portion, said negative resistance region being continuous with said second positive resistance region along a high-resistance valley region, said valley portion extending along portions of said second positive resistance and said negative resistance regions; said first stable state being defined along that positive resistance region discontinuous with said valley region, a signal line, a semiconductor diode multipling each of said bistable elements to said signal line, means for switching selected ones of said elements to said second stable state, means for normally biasing said semiconductor diodes connected to said selected elements sufficiently conductive to define said second stable state along said valley region, and means for momentarily biasing a selected one of said bistable elements to direct signal energy along said signal line.

3. A circuit arrangement as defined in claim 2 wherein said establishing means is effective to develop a first predetermined voltage across each of said elements operating in said second stable state, and each of said semiconductor diodes exhibits a current-voltage characteristic having a low resistance portion and a high resistance portion continuous at a knee, and wherein said establishing means includes additional means for normally biasing said signal line at a second predetermined voltage, the algebraic sum of said first and said second predetermined voltages being at least equal to that voltage necessary to bias said semiconductor diode beyond said knee and along said low resistance portion of said characteristic.

4. A circuit arrangement as defined in claim 2 wherein said bistable memory elements are tunnel diodes.

5. In a memory system comprising a plurality of memory cells arranged in a coordinate array, each of said memory cells including a bistable element having a current-voltage characteristic having a negative resistance region between a first and a second positive resistance region, said negative resistance region being continuous with said second resistance region along a high-resistance valley region, means for selectively switching said bistable elements between stable operating states defined on said characteristic, means for interrogating said memory cells on a group basis, said interrogating means including sensing means and asymmetrical diode devices connecting said sensing means to said bistable element in each memory cell of said corresponding groups, each of said diode devices have a current-voltage characteristic which is characterized by low-resistance and high-resistance regions, and means for maintaining each of said diode devices operative along said low-resistance region while said connected bistable element is in a particular operating state whereby the operation of said bistable element is defined along said high-resistance valley region.

6. In a memory system as defined in claim 5 wherein each of said common lines are formed as a transmission line and means for properly terminating each of said transmission lines.

7. In a memory system as defined in claim 5 wherein each of said bistable memory elements is a tunnel diode.

8. In a memory system as defined in claim 5 wherein said interrogation means are inoperative to alter the memory state of said bistable memory elements.

9. A memory circuit comprising a plurality of bistable memory elements arranged in a plurality of rows and columns, each of said memory elements exhibiting a negative resistance region intermediate a first and a second positive resistance region, said negative resistance region being continuous with said second positive resistance region along a high-resistance valley region, means for selectively switching asid memory elements between low voltage and high voltage stable states of operation defining distinct memory states, said low voltage state of operation being defined along said first positive resistance region, and interrogation means for nondestructively ascertaining the memory states of said memory elements in a particular one of said rows, said interrogation means including sensing means corresponding to particular columns of said memory elements, variable impedance means having a low impedance state and a high impedance state connecting each of said memory elements in said particular column to said corresponding sensing means, and means for maintaining said variable impedance means in a low impedance state while said connected memory element is operating in a high voltage state of operation to define said high voltage state of operation along said high-resistance valley region.

10. A memory circuit as defined in claim 9 wherein said memory elements are tunnel diodes.

11. A memory circuit as defined in claim 9 wherein said variable impedance means are semiconductor diodes.

12. A memory system comprising a plurality of M conductive lines and a plurality of N conductive lines in transverse arrangement, a plurality of memory cells connected one at each crossover point of said M and said N conductive lines so as to define a coordinate array, each of said memory cells including a bistable device exhibiting a current-voltage characteristic having a negative resistance region between a first and a second positive resistance region, said negative resistance region being continuous with said second positive resistance region along a high-resistance valley portion, means for selectively switching each of said elements between low voltage and high voltage states of operation defining distinct memory states, said low voltage state of operation being defined along said first positive resistance region, means for interrogating the memory state of selected memory cells on a group basis, said interrogating means including sensing means coupled along semiconductor diodes to said bistable elements included in memory cells comprising each of said groups, said semiconductor diodes having a low impedance state and a high impedance state, and means for biasing each of said semiconductor diodes in a low impedance state when said coupled memory cell is in said high voltage state of operation whereby said high voltage stable state of operation is defined along said high-resistance valley portion of said characteristic.

13. A memory system as defined in claim 12 wherein each of said memory cells comprises a tunnel diode and a first and a second impedance means connecting said tunnel diode to said M and said N conductive lines, respectively, at said crossover points.

14. In a memory system as defined in claim 13 wherein each of said M and said N conductive lines is a transmission line having a characteristic impedance less than that of said first and said second impedance means when divided by the integers M and N, respectively.

References Cited by the Examiner

UNITED STATES PATENTS 3,107,345 10/1963 Gruodis ----------- 340—173

OTHER REFERENCES

Publication: IBM Tech. disclosure bulletin, vol. 3A No. 11. Pages 41 and 42, April 1961.

BERNARD KONICK, *Primary Examiner.*

IRVING L. SRAGOW, *Examiner.*

T. W. FEARS, *Assistant Examiner.*